United States Patent [19]

Suzuki et al.

[11] Patent Number: 5,287,132
[45] Date of Patent: Feb. 15, 1994

[54] VIDEO PROJECTOR

[75] Inventors: Shinji Suzuki; Hidemi Sasaki; Norio Kato, all of Tokyo, Japan

[73] Assignee: Fuji Photo Film Co., Ltd., Minami-ashigara, Japan

[21] Appl. No.: 75,923

[22] Filed: Jun. 14, 1993

Related U.S. Application Data

[63] Continuation of Ser. No. 833,731, Feb. 11, 1992, abandoned.

[30] Foreign Application Priority Data

Feb. 16, 1991 [JP] Japan .................... 3-022447

[51] Int. Cl.$^5$ ............................. G03B 21/00
[52] U.S. Cl. ............................. 353/119; 353/43; 353/57
[58] Field of Search ............... 353/119, 43, 122, 87, 353/85, 57, 61, 60, 58, 52, 43; 359/83

[56] References Cited

U.S. PATENT DOCUMENTS

| | | | |
|---|---|---|---|
| 4,168,888 | 9/1979 | Kiehl et al. | 353/122 |
| 4,372,068 | 2/1983 | Knapp | 353/85 |
| 4,756,614 | 7/1988 | Kato et al. | 353/43 |
| 4,756,615 | 7/1988 | Hildebrand | 353/119 |
| 4,925,295 | 5/1990 | Ogawa et al. | |
| 4,963,001 | 10/1990 | Miyajima | |
| 4,976,429 | 12/1990 | Nagel | 353/122 |
| 5,170,196 | 12/1992 | Itoh | 353/122 |

FOREIGN PATENT DOCUMENTS 1115371 12/1987 Japan .

*Primary Examiner*—William A. Cuchlinski, Jr.
*Assistant Examiner*—William C. Dowling
*Attorney, Agent, or Firm*—Sughrue, Mion, Zinn, Macpeak & Seas

[57] ABSTRACT

It is an object of the invention to provide a video projector which can be driven by a battery and can be reduced in both size and weight. A packing case for a video projector is composed of a cabinet, which is divided into two upper and lower parts, and a cover disposed behind the cabinet. The cover is disposed removably with respect to the cabinet. By opening the cover situated behind the projector light source, a lamp forming the projector light source can be replaced easily. Also, the cover includes on the back surface thereof a battery mounting portion for mounting a battery used to drive the projector, so that the battery can be mounted to the outer back surface of the cover.

12 Claims, 5 Drawing Sheets

VIDEO PROJECTOR

This is a continuation of application Ser. No. 07/833,731, filed Feb. 11, 1992, and now abandoned.

BACKGROUND OF THE INVENTION

1. Field of the Invention

The present invention relates to a video projector and, in particular, to a video projector which enlarges and projects an image displayed on transmission-type display means such as a transmission-type liquid crystal panel or the like by use of a projection lens and a projector light source.

2. Description of the Related Art

In general, this type of video projector uses, as a projector light source, a lamp of large power consumption (for example, a halogen lamp of several hundreds of watts).

Also, according to the prior art, a liquid crystal view finder of a VTR with a camera is used, a projector light source having a high brightness is provided instead of a normal back light, and the upside and downside and/or right and left of a display image are inverted, whereby the above-mentioned view finder can be used as a video projector (see Japanese Utility Model Application Laid-Open No. 1-115371).

However, conventionally, there has been available only an exclusive video projector which uses commercial power provided through a wall outlet because the projector light source thereof consumes a large quantity of power. Also, since the projector light source produces a large quantity of heat, the conventional exclusive video projector requires a cooling fan of a large size. For these reasons, there has not been available an exclusive video projector of a small size and a light weight which is handy to carry and can be driven by a battery.

On the other hand, another type of conventional video projector which is used in combination with the liquid crystal view finder of the VTR with a camera as described above, uses the battery of the VTR with a camera as the power supply source thereof and thus is reduced in size. However, in order to project enlargedly the same image as the finder image, it is necessary to invert the upside and downside and/or right and left of the finder image before it is projected.

SUMMARY OF THE INVENTION

The invention aims at eliminating the drawbacks found in the above-mentioned conventional video projectors. Accordingly, it is an object of the invention to provide a video projector which can be driven by a battery, is easy to use, and is compact and light weight.

In order to achieve the above object, according to the invention, there is provided a video projector which comprises a cabinet which is divided into two upper and lower or right and left parts; a projection lens, transmission-type display means for displaying an image in accordance with a video signal, and a projector light source, respectively disposed within the cabinet; and a cover removably disposed in the rear of the cabinet for replacing a lamp forming the projector light source, the cover including on the back surface thereof a battery mounting portion for mounting a battery used to drive the projector.

Also, according to another aspect of the invention, there is provided a video projector which comprises a video cabinet which is divided into two upper and lower or right and left parts; a projection lens, transmission-type display means for displaying an image in accordance with a video signal, and a projector light source respectively disposed within the cabinet; a cooling fan disposed by the transmission-type display means; an air intake port formed on the side portion of the cabinet opposed to the fan; and a jack disposed adjacent to the air intake port for inputting the video signal.

According to the invention, a video projector packing case is composed of a cabinet, which is divided into two upper and lower or right and left parts, and a cover disposed in the rear of the cabinet. The cover is arranged removably with respect to the cabinet. The lamp forming the projector light source can be replaced with ease by opening the cover located behind the projector light source. Also, the cover includes on the back surface thereof a battery mounting portion which is used to mount a battery for driving the projector, whereby the battery can be mounted onto the outer back surface of the cover.

Also, there is formed an air intake port on the side portion of the cabinet opposed to the cooling fan disposed by the transmission-type display means, and adjacent to the air intake port there is provided an input jack for inputting a video image. A connecting cord is inserted into the input jack, which eliminates the possibility that the air intake port may be closed by a wall or the like due to the above-mentioned positional relation between the input jack and air intake port.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

A detailed description will hereunder be given of the preferred embodiment of a video projector according to the present invention with reference to the accompanying drawings.

Figure 1:
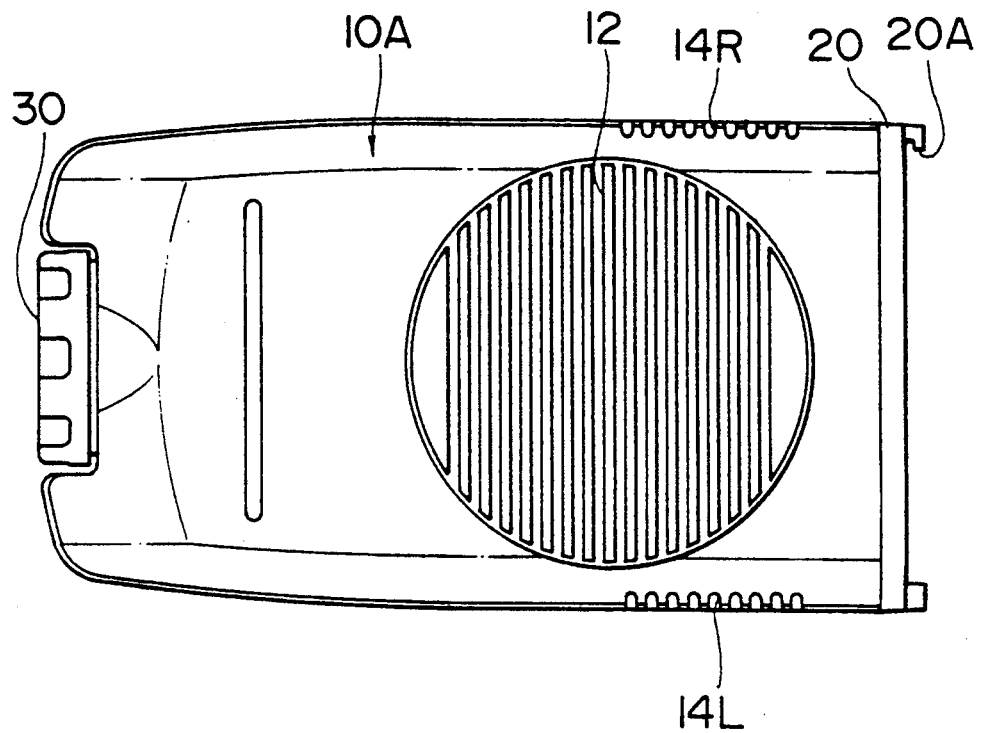
FIG. 1 is a plan view of the outer appearance of a video projector according to the invention.
Figure 2:
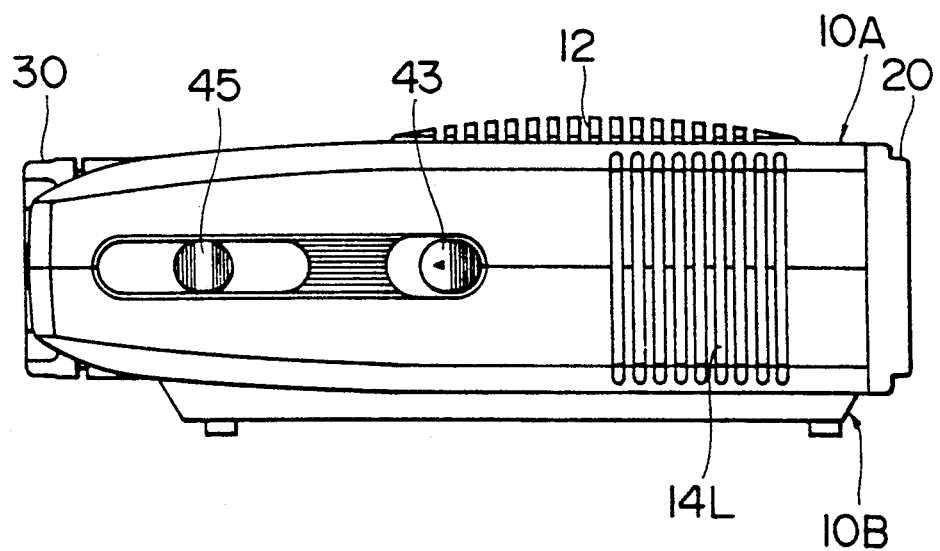
FIG. 2 is a side view of the outer appearance of a video projector according to the invention.
Figure 3:
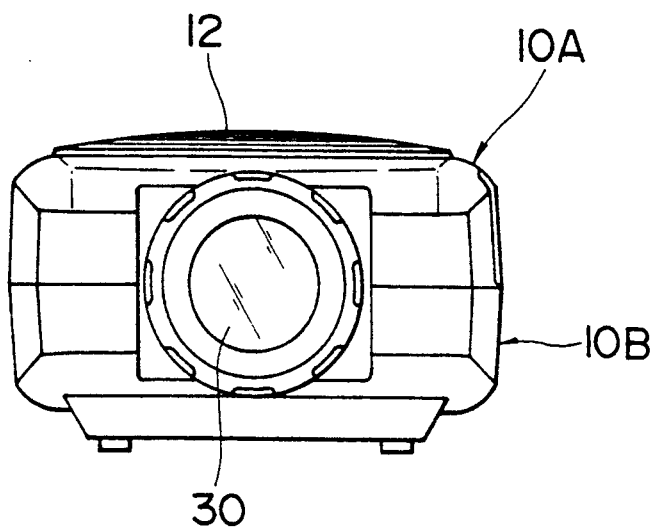
FIG. 3 is a front view of the outer appearance of a video projector according to the invention.

In FIGS. 1 to 3, there are shown a plan view, a side view and a front view of the outer appearance of a video projection constructed according to the invention, respectively. Also, in FIG. 4, there is shown an exploded perspective view of the detailed structure of the above video projector.

As shown in these figures, the present video projector includes a packing case for the video projector, which packing case is composed of two upper and lower cabinets 10A, 10B divided from each other and a cover 20 disposed in the rear of the two cabinets 10A, 10B.

Figure 4:
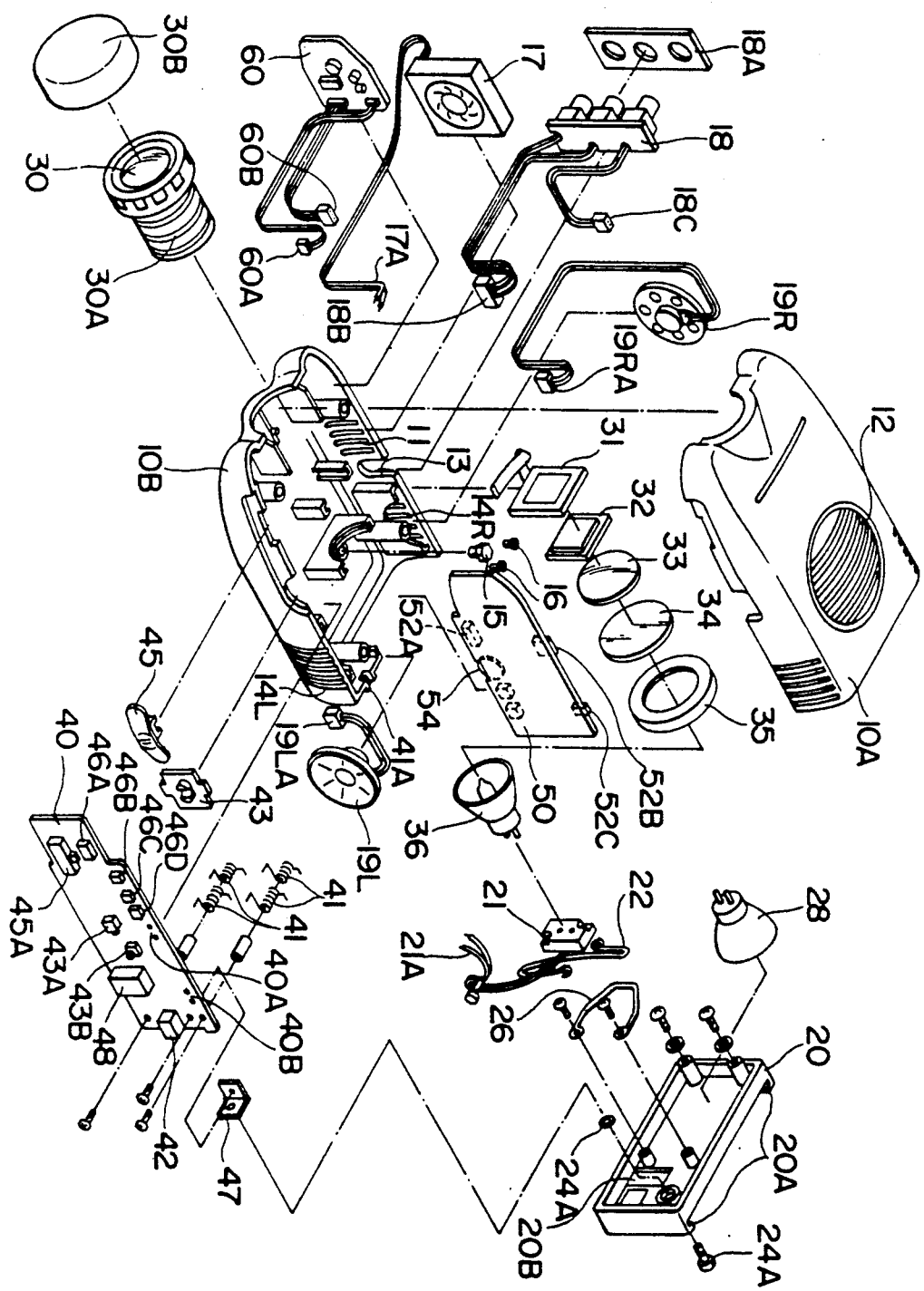
FIG. 4 is an exploded perspective view of the detailed structure of a video projector according to the invention.
Figure 5:
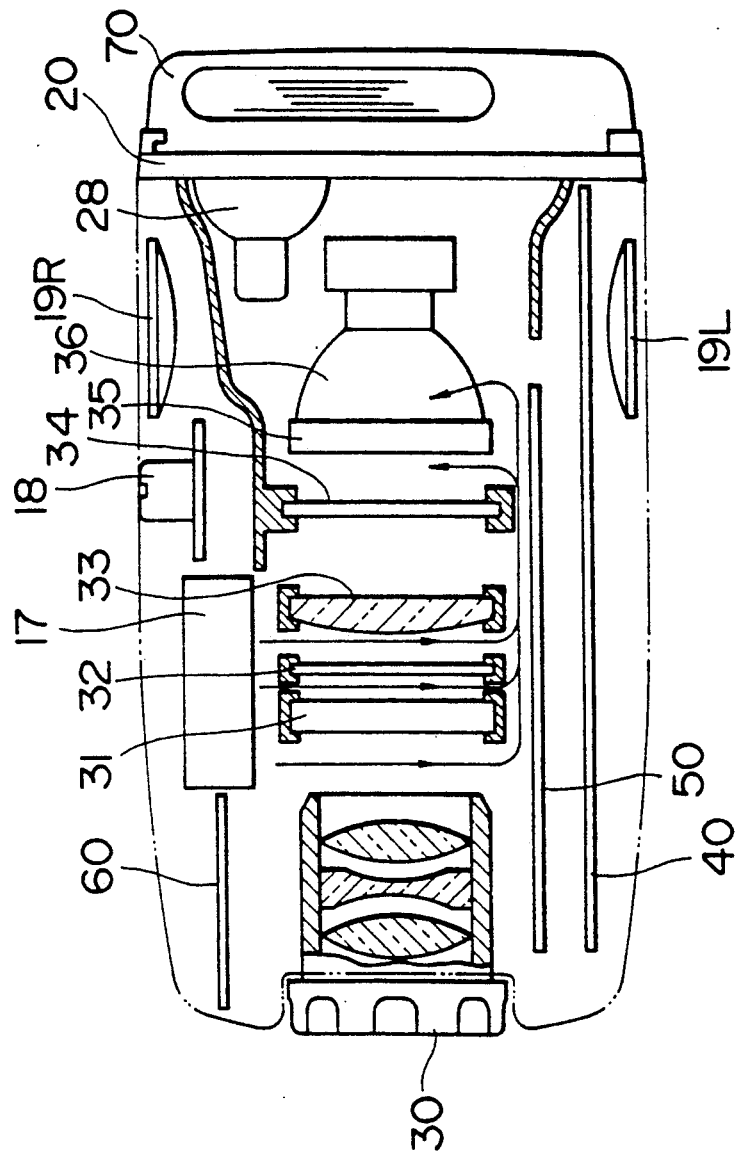
FIG. 5 is a schematic view of the internal structure of a video projector according to the invention.

Centrally of the two cabinets 10A, 10B, there are disposed a projection lens 30, a light transmissive liquid crystal panel 31 of the order of 1 inch, a polarizing plate 32, a condenser lens 33, a heat cut-off filter 34, a lamp support ring 35 and a halogen lamp 36 with a mirror of 18 watts sequentially in a line (see FIG. 5). As shown in FIG. 4, there is formed a screw 30A on the peripheral portion of the projection lens 30, so that focusing can be achieved by rotating the projection lens 30. Also, reference character 30B designates a lens cap.

The two cabinets 10A and 10B include air intake ports in either of the side portions thereof and the upper cabinet 10A includes an air discharge opening 12 in the top portion thereof. Also, adjacent to the air intake ports 11, there is formed an opening 13 for an input jack and, further, on both sides of the cabinet, there are provided grilles 14R and 14L for stereo speakers. The lower cabinet 10B includes in the bottom portion thereof a female screw 15 for mounting a tripod, which female screw 15 is fixed by means of screws 16, 16 to the lower cabinet bottom portion. At a position opposed to the air intake ports 11, there is arranged a cooling fan 17. And, an input jack 18 used to input a video signal and right and left sound signals is disposed in the opening 13, and a right speaker 19R and a left speaker 19L are disposed at positions which are opposed to the grilles 14R and 14L. In FIG. 4, 18A designates a decorative cover.

Further, within the cabinets 10A and 10B, there are arranged a substrate 40 for a power supply and audio, a substrate 50 for video, and a DC/DC converter 60.

In the power supply/audio substrate 40, there are provided four terminal pins 41 for inputting of the power supply. These terminal pins 41 are disposed in such a manner that they elastically project out from a projected portion 41A provided in the rear portion of the cabinet. Also, in the substrate 40, there are further arranged a DC jack 42, switches 43A and 43B for turning on/off the power supply, a volume 45A, connectors 46A~46D, an angle 47 for mounting the cover 20, a relay 48 and the like.

A connector 18B for sound of the input jack 18 is connected to the connector 46A, a connector 60A on the input side of the DC/DC converter 60 is connected to the connector 46B, and connectors 19RA, 19LA of the speakers 19R, 19L are respectively connected to the connectors 46C, 46D. A cord 17A of the fan 17 and a cord 21A of a lamp terminal board 21 are respectively mounted to the output terminals 40A, 40B of the substrate 40 by soldering, respectively.

Also, in the cabinets 10A and 10B, there are provided a power supply button 43 and a volume knob 45 in such a manner that they are respectively opposed to the power supply on/off switches 43A, 43B and the volume 45A (see FIG. 2). If the power supply button 43 is moved, then the switch 43A is operated to thereby turn on the power supply and, if the power supply button 43 is depressed, then the switch 43B is operated to thereby turn off the power supply. Also, by sliding the volume knob 45 the volumes of the speakers 19R, 19L can be controlled.

The video substrate 50 has a liquid crystal circuit and the like on board. In FIG. 4, 52A~52C respectively designate connectors. A connector 31A of the liquid crystal panel 31 having a flexible print wiring is connected to the connector 52A, a connector 60B on the output side of the DC/DC converter 60 is connected to the connector 52B, and a video connector 18C of the input jack 18 is connected to the connector 52C. Also, 54 designates a knob for controlling the brightness.

The cover 20 is removably disposed in the rear of the cabinets such that the lamp 36 can be replaced. In other words, a screw 24 having a washer 24A for prevention of slippage is mounted to the cover. The cover 20 is fitted into a predetermined position behind the cabinets, and the screw 24 is threaddedly mounted to the angle 47 by use of a coin, so that the cover 20 can be mounted. Also, on the back surface of the cover 20, there is formed a battery mounting portion 20A for mounting a battery 70 (see FIG. 5) for driving the projector. Inside the cover 20, there is formed a recessed portion 20B into which the projected portion 41A including the power supply inputting terminal pins 41 provided on the cabinet side is fitted. And, in a state in which the cover 20 is mounted, the terminal pins 41 are allowed to face through the recessed portion 20B to the battery mounting surface of the cover 20. Due to such structure, there is eliminated the need for direct provision of the power supply input terminals in the cover 20, and also there is eliminated the possibility that the wirings and the like may interfere when opening and closing the cover 20. Further, inside the cover 20, there is provided a U-shaped, elastic wire member 26, which is used to hold a spare lamp 28 by and between its arms inside the cover 20.

Next, description will be given below of the operation of the video projector according to the invention.

Figure 6:
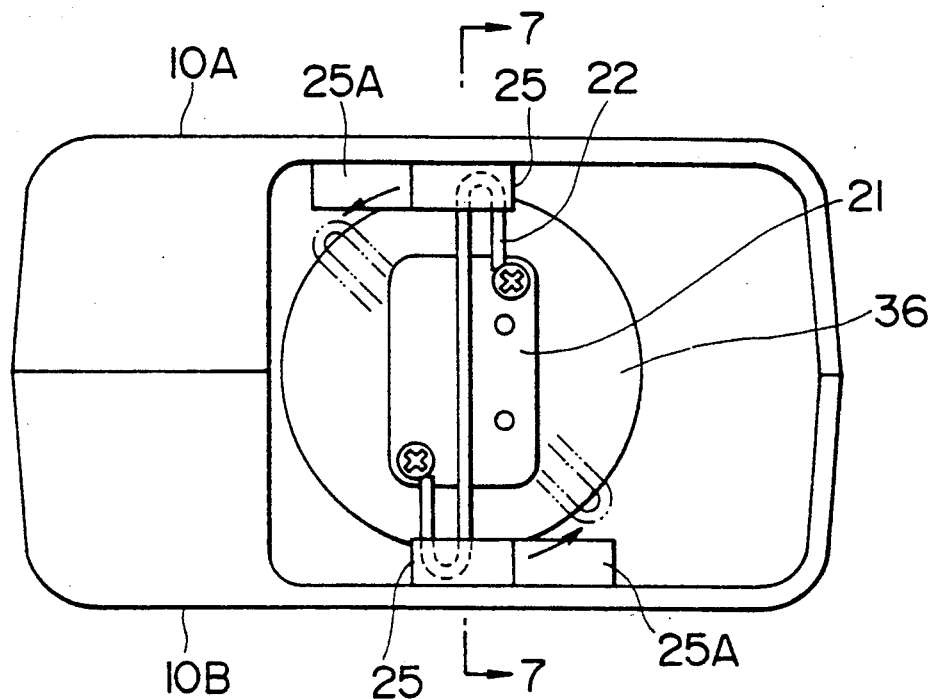
FIG. 6 is a rear view of a video projector according to the invention, with the cover of the video projector being removed; and, FIG. 7 is a section view taken along the line 7—7 in FIG. 6.
Figure 7:
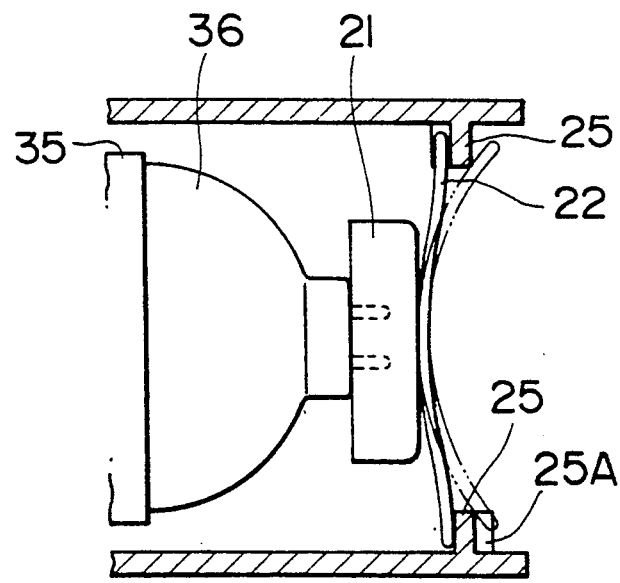

In FIG. 6, there is shown a back view of the video projector according to the invention, with the cover 20 removed therefrom, and in FIG. 7 there is shown a section view taken along the line 7—7 in FIG. 6.

As shown in these figures, there is provided in the lamp terminal board 21 an elastic wire member 22 and a lamp 36, which is mounted on the lamp terminal board 21, is fixed in such a manner that it is pressed against a lamp support ring 35 by means of an elastic force applied through the wire member 22.

To replace the lamp 36, at first, the wire member 22 is pressed against the elastic force thereof to thereby disconnect the engagement between the wire member 22 and engagement portions 25, 25 for holding the wire member 22. Then, the wire member 22 is rotated counterclockwise in FIG. 6. As a result of this, the lamp 36 can be taken out from the cabinet.

On the other hand, when fixing the lamp 36 within the cabinet, the wire member 22 is inclined in such a manner as shown by broken lines in FIG. 6, the lamp 36 is inserted in such a manner that the lamp 36 is in contact with the lamp support ring 35, and after then the wire member 22 is rotated clockwise in FIG. 6. As a result of this, the wire member 22 is pushed up along the tapered portions 25A, 25A of the engagement portions 25, 25 so that the member 22 is brought into engagement with the engagement portions 25, 25.

As mentioned above, since the cover 20 is situated behind the lamp 36, the lamp 36 can be easily replaced by opening the cover 20. Also, according to the invention, a battery 70 for driving the projector is attached to the outer surface of the battery mounting portion 20A formed in the cover 20. Alternatively, the battery mounting portion can be formed on the top surface or side surface of the cabinet. However, in this case, if a heavy battery is used, the heavy weight of the battery will adversely worsen the stability of the video projector which is made compact and light weight. Also, if such a battery mounting portion is provided on the bottom surface of the cabinet, then it is not possible to form a tripod mounting female screw for mounting the video projector onto a tripod. Further, a battery storage portion can be provided within the cabinet, but, in this case, the cabinet itself must be increased in size. In view of these circumstances, in order to reduce the size and weight of the video projector, it is best that the battery mounting portion be formed in the cover situated in the rear of the cabinet and the battery is mounted to the outer surface of the battery mounting portion.

Also, as shown in FIG. 5, the cooling fan 17 is disposed by the liquid crystal panel 31. The fan 17 feeds the air taken in from the air intake ports 11 (see FIG. 4) in such a manner as shown by arrows in FIG. 5 to thereby cool down mainly the liquid crystal panel 31. The air that has been used for cooling the liquid crystal panel 31 is then guided backwardly by the video substrate 50, and is discharged out through the air discharge opening 12 (see FIG. 4) which is located substantially upward of the lamp 36. Part of the air flows along the lower portions of the cabinet and is then discharged out through the air discharge opening 12. Due to this, other parts such as a lamp and the like other than the liquid crystal panel can also be cooled down. Also, since the video substrate is also cooled down, there can be obtained an advantage that there is eliminated the need to provide separately a partition wall which is used to protect the video substrate 50 against heat.

Further, due to the fact that an input jack 18, into which a connecting cord can be inserted, is provided adjacent to the cooling fan 17, there is eliminated the possibility that the intake ports 11 situated opposed to the fan 17 can be closed by a wall or the like.

As has been described heretofore, according to the video projector of the invention, due to the fact that a battery is mounted to the outer surface of a cover disposed removably in the rear of a cabinet, there can be supplied a compact and light weight video projector which can be driven by a battery, is easy to replace a lamp, and can be used conveniently. Also, since an input jack is provided adjacent to air intake ports in a cooling fan, there is eliminated the possibility of the air intake ports being closed by a wall or the like. Further, due to the fact that there is provided a circuit substrate in such a manner that the circuit substrate is opposed to the cooling fan with transmission-type display means and a projector light source between them, and also due to the fact that there is arranged an air passage which guides the air fed from the cooling fan through the transmission-type display means by the circuit substrate to the projector light source situated in the rear thereof, the circuit substrate can be cooled down and at the same time there is eliminated the need for separate provision of a partition wall for protecting the circuit substrate against heat.

It should be understood, however, that there is no intention to limit the invention to the specification forms disclosed, but on the contrary, the invention is to cover all modifications, alternate constructions and equivalents falling within the spirit and scope of the invention as expressed in the appended claims.

We claim:

1. A video projector comprising:
   a cabinet divided into two upper and lower or right and left parts;
   a projection lens, transmission-type display means for displaying an image in accordance with a video signal, and a projector light source, respectively disposed within said cabinet;
   a cover disposed removably in the rear of said cabinet for replacing a lamp forming said projector light source, said cover including on the back surface thereof a battery mounting portion for mounting a battery for driving said projector;
   a power supply input terminal formed on said cabinet opposed to said cover; and
   means for allowing said power supply input terminal to contact a terminal of said battery.

2. A video projector as set forth in claim 1, wherein there are provided two speakers respectively disposed right and left of said cabinet.

3. A video projector as set forth in claim 1, wherein a female screw for mounting a tripod is disposed on the bottom surface of said cabinet.

4. A video projector as set forth in claim 1 further including a fan for cooling disposed by said transmission-type display means.

5. A video projector as set forth in claim 1 further including an air intake port formed on the side portion of said cabinet opposed to said fan.

6. A video projector as set forth in claim 1 further including an input jack disposed adjacent to said air intake port for inputting said video signal.

7. A video projector, comprising:
   a cabinet divided into two upper and lower or right and left parts;
   a projection lens, transmission-type display means for displaying an image in accordance with a video signal, and a projector light source, respectively disposed within said cabinet; and
   a cover disposed removably in the rear of said cabinet for replacing a lamp forming said projector light source, said cover including on the back surface thereof a battery mounting portion for mounting a battery for driving said projector, wherein said cover includes therein a lamp mounting portion for mounting a spare lamp.

8. A video projector comprising:
   a cabinet divided into two upper and lower or right and left parts;
   a projection lens, transmission-type display means for displaying an image in accordance with a video signal, and a projector light source, respectively disposed within said cabinet;
   a fan for cooling disposed by said transmission-type display means;
   an air intake port formed on the side portion of said cabinet opposed to said fan; and,
   an input jack for receiving a video cable for inputting said video signal and disposed adjacent to said air intake port, said input jack and video cable being disposed so as to prevent the blockage of said air intake port when said projector is in operation.

9. A video projector as set forth in claim 8 further including:
   an air discharge opening formed in the top portion of said cabinet opposed to said projector light source; and, a circuit substrate disposed opposingly to said fan with said transmission-type display means and projector light therebetween, wherein said circuit substrate forms a part of an air passage which guides air supplied from said fan through said transmission-type display means to said air discharge opening through said projector light source disposed in the rear of said transmission-type display means.

10. A video projector, comprising:

a cabinet divided into two upper and lower or right and left parts;

a projection lens, transmission-type display means for displaying an image in accordance with a video signal, and a projector light source, respectively disposed within said cabinet;

a cover disposed removably in the rear of said cabinet for replacing a lamp forming said projector light source, said cover including on the back surface thereof a battery mounting portion for mounting a battery for driving said projector;

a projected portion including a power supply input terminal formed on said cabinet opposed to said cover; and a recessed portion formed in said cover for allowing insertion of said projected portion, said recessed portion allowing said power supply input terminal to contact a terminal of said battery mounted to said battery mounting portion.

11. A video projector as set forth in claim 10, wherein there are provided two speakers respectively disposed right and left of said cabinet.

12. A video projector as set forth in claim 10, wherein a female screw for mounting a tripod is disposed on the bottom surface of said cabinet.

* * * * *